United States Patent [19]

Brown-Wensley et al.

[11] Patent Number: 4,537,942

[45] Date of Patent: Aug. 27, 1985

[54] POLYHYDRIDOSILANES AND THEIR CONVERSION TO PYROPOLYMERS

[75] Inventors: Katherine A. Brown-Wensley, Lake Elmo; Robert A. Sinclair, St. Paul, both of Minn.

[73] Assignee: Minnesota Mining and Manufacturing Company, St. Paul, Minn.

[21] Appl. No.: 597,540

[22] Filed: Apr. 6, 1984

Related U.S. Application Data

[63] Continuation-in-part of Ser. No. 579,017, Feb. 10, 1984, abandoned.

[51] Int. Cl.$^3$ .............................................. C08G 77/06
[52] U.S. Cl. ..................................... 528/12; 525/474; 528/25; 528/31; 528/43; 556/430; 556/431; 556/474; 556/432
[58] Field of Search ............... 556/474, 430, 431, 432; 528/31, 12, 25, 43; 525/474

[56] References Cited

U.S. PATENT DOCUMENTS

| | | | |
|---|---|---|---|
| 4,138,509 | 2/1979 | Ingle et al. | 427/86 |
| 4,202,928 | 5/1980 | Staebler | 428/446 |
| 4,276,424 | 6/1981 | Peterson, Jr. et al. | 556/430 |
| 4,283,376 | 8/1981 | Yajima et al. | 423/345 |
| 4,289,720 | 9/1981 | Yajima et al. | 264/63 |
| 4,310,482 | 1/1982 | Baney | 264/65 |
| 4,363,828 | 12/1982 | Brodsky et al. | 427/39 |
| 4,374,182 | 2/1983 | Gaul et al. | 427/226 |
| 4,387,080 | 6/1983 | Hatta et al. | 423/345 |
| 4,393,097 | 7/1983 | Hirai et al. | 427/94 |
| 4,397,722 | 8/1983 | Haller | 204/159.13 |

FOREIGN PATENT DOCUMENTS

2077710 12/1981 United Kingdom .

OTHER PUBLICATIONS

Encyclopedia of Polymer Science and Technology, vol. 4, pp. 331–336, (1966), Schultz.
Organosilicon Compounds, Chapter 12, pp. 357–360, Academic Press, New York, (1960), Eaborn.
Comprehensive Organometallic Chemistry, The Synthesis, Reactions and Structures of Organometallic Compounds, vol. 2, pp. 366–387, 393–395, (1982), West.
Journal of Polymer Science Part A-1, vol. 8, 1970, pp. 711–777, Bruck et al.
The Separation of Volatile Silanes and Germanes by Gas-Liquid Chromatography, pp. 189 and 190, Proc. Chem. Soc. (1959), Burer.
Polymeric Carbons–Carbon Fiber, Glass and Char, p. 1, Jenkins et al., (1976).
Angew. Chem. Intl. Ed. Eng., vol. 12, No. 4, p. 316 (1973), Hengge et al. and vol. 16, No. 6, p. 403.
Rumada and K. Tamao, F.G.A. Stone and West Advances in Organometallic Chemistry, vol. 6, pp. 34–36, Academic Press, N.Y., (1968).
Schilling, Jr. Organosilane Polymers, VIII, Union Carbide Corp., Tarrytown, NY, and Office of Naval Research, Sep. 1983, pp. 1–4, Final Report 83-4.
Schilling, Jr. et al., Organosilane Polymers, V, Hydroysilyl-Modified Polycarbosilane Precursors for Silicon Carbide, Union Carbide Corp., Tarrytown, NY, Office of Naval Research, Technical Report, 83-1, Sep. 1983.

*Primary Examiner*—Melvyn I. Marquis
*Attorney, Agent, or Firm*—Donald M. Sell; James A. Smith; Lorraine R. Sherman

[57] ABSTRACT

A polyhydridosilane has a catenated silicon backbone of 9 to 4000 silicon atoms with an average number of hydrogen atoms per silicon atoms in the range of 0.3 to 2.2, at least 0.1 gram of the polyhydridosilane being soluble at 20° C. in 100 grams of tetrahydrofuran, toluene, or methylene chloride. The polyhydridosilane can be derivatized or it can be converted to a pyropolymer or a nitrogen-containing pyropolymer which is useful as an abrasive, ceramic, electrical, or electro-optical material.

19 Claims, No Drawings

POLYHYDRIDOSILANES AND THEIR CONVERSION TO PYROPOLYMERS

This is a continuation-in-part of application Ser. No. 579,017, filed Feb. 10, 1984 and now abandoned.

FIELD OF THE INVENTION

The present invention relates to polyhydridosilanes having catenated silicon backbones, certain derivatives thereof, their conversion to pyropolymers, and methods therefor. The pyropolymers are useful, for example, as abrasives, ceramics, and electrical or electro-opical materials.

BACKGROUND ART

The unique properties which characterize organic compounds are due not solely to carbon atoms, but rather to the bonding of carbon atoms to each other and to the combination of carbon and hydrogen atoms. Silicon, in the same group of the periodic table as carbon, shares some of the bonding characteristics of carbon and forms analogous catenated structures but has its own unique qualities, namely, generally greater chemical reactivity, and has been the subject of extensive research in recent years.

Catenated silicon systems are known and are reviewed by R. West in G. Wilkinson, F. G. A. Stone, and E. W. Abel, "Comprehensive Organometallic Chemistry", Volume 2, Chapter 9.4, pages 365–387, Pergamon Press, New York (1982). The silicon-silicon bonds in such systems are most often formed from two silicon-halogen bonds with a Periodic Groups IA or Group IIA metal. Generally, groups such as alkyl, halogen, alkoxy, or aryl are predominantly attached to the catenated silicon backbone.

In contrast to the reported progress in the field of organo-substituted polysilanes, the syntheses of the silicon analogs of the parent carbon polymers such as polyethylene or polypropylene have remained more elusive. These polymers are classed as silicon hydrides, referred to in this patent application as polyhydridosilanes, and are generally reactive towards the atmosphere and not amenable to preparation and study without manipulation using vacuum line and/or controlled atmosphere (dry box) techniques.

A few examples of catenated silicon systems containing hydrogen atoms attached to a silicon backbone are known: cyclic polysilanes $(SiH_2)_n$ where n=5, 6 have been made in multistep syntheses by E. Hengge and G. Bauer, *Angew. Chem. Intl. Ed. Eng.*, 12 (1973), 316 and E. Hengge and D. Kovar, *Angew. Chem. Intl. Ed. Eng.*, 16 (1977), 403; mixtures of linear and branched polysilanes $H(SiH_2)_nH$ where n=2 to 8 have been made by the hydrolytic decomposition of magnesium silicide by K. Borer and C. S. G. Phillips, *Proc. Chem. Soc.*, 189, (1959). Coupling of alkylhalohydridosilanes with metals to yield Si—Si bonds from systems containing Si—H and Si—Cl bonds and related reactions are reviewed by M. Kumada and K. Tamao in F. G. A. Stone and R. West "Advances in Organometallic Chemistry", Volume 6, pp. 34–36, Academic Press, NY (1968) and disclosed in U.S. Pat. No. 4,276,424.

Insoluble polysilanes have been disclosed. Aromatic silane polymers, formed in radio-frequency plasmas, and which are resistant to high temperature, adherent to substrates, and electrically insulating are disclosed in U.S. Pat. No. 4,397,722. Insoluble orange powders having the approximate composition $(SiH_n)_x$ where n is 1 or 2 and x is large are taught in UK Patent Application GB 2,077,710A. As is known in the art, a substantial degree of crosslinking will render a polymer insoluble (see Schultz, A. R., *Encyclopedia of Polymer Science and Technology*, 4, 336, John Wiley & Sons, NY (1966)).

Silyl derivatives of Periodic Group IA or IIA metals can be formed from silicon-halogen, silicon alkoxy, silicon-hydride or silicon-silicon bonds, as described in C. Eaborn, "Organosilicon Compounds", Chapter 12, pages 357–360, Academic Press, New York (1960). Reaction of catenated silicon systems with alkali metals to give delocalized radical anions has been reviewed by R. West in "Comprehensive Organometallic Chemistry", supra, pp. 393–395.

In the thermal treatment of polymers wherein crosslinking occurs, the resultant materials become stabilized due to the formation of a rigid insoluble network and the stable products are referred to as pyropolymers by S. D. Bruck and P. F. Liao (*J. Polymer Sci.*, Part A-1, 8, 771 (1970)). Pyropolymers have also been described as materials that have intermediate properties between polymer and carbon by G. M. Jenkins and K. Kawamura, "Polymeric Carbons—Carbon Fibre, Glass and Char", p. 1, Cambridge University Press, London, England (1976).

Formation of elemental silicon by the energetic decomposition of gaseous molecules containing hydrogen and/or halogen and from one to about three silicon atoms is well known and is taught, for example, in U.S. Pat. Nos. 4,363,828 and 4,202,928.

Polymeric precursors to elemental silicon are less well known, although perhalopolysilanes are mentioned as precursors in U.S. Pat. Nos. 4,374,182 and 4,138,509. The formation of silicon carbide (as fibers, films, binders, bulk material and the like) by the energetic treatment of polymeric organosilanes is disclosed, for example, in U.S. Pat. Nos. 4,310,482 and 4,283,376. As U.S. Pat. No. 4,289,720 discloses, multivalent elements such as boron, carbon, nitrogen, oxygen and transition metals and the like, which are incorporated into the silicon-containing polymer, are in general also found in the pyropolymer. Alternatively, such multivalent elements can be incorporated into the final pyropolymer by introducing them subsequent to formation of the initial polysilane (such as during pyrolysis). For example, decomposition of halogenated silanes in the presence of nitrogen sources such as ammonia, nitrogen, or their mixtures to form silicon nitride is reported in assignee's copending U.S. patent application Ser. No. 508,852, filed June 29, 1983, now U.S. Pat. No. 4,505,720. U.S. Pat. No. 4,393,097 describes a similar amorphous silicon-nitrogen-carbon composition formed by chemical vapor deposition. U.S. Pat. No. 4,387,080 describes the heating of a mixture containing silicon, organic silicon polymer, and flaky beta-silicon carbide with gaseous ammonia to give a silicon nitride-containing silicon carbide.

SUMMARY OF THE INVENTION

Briefly, the present invention provides soluble polyhydridosilanes having catenated silicon backbones of 9 to 4000, preferably 12 to 4000, silicon atoms with an average number of hydride (hydrogen) atoms per silicon atom in the range of 0.3 to 2.2. In view of the known high reactivity of hydridosilanes towards air, oxygen, water, and in particular to Periodic Groups IA and IIA metals, it is surprising that the polyhydridosilanes obtained by the method of the present invention are tractable materials which are solids at room temperature and pressure and have the desirable property of being soluble in organic solvents. The polyhydridosilanes can have use as elastomers, films, fibers, coatings, in composites or articles having utility such as photoresists, adhesives, or surface modifiers.

In another aspect, the chemistry of the Si-H bond in these polymers can be exploited e.g., reaction across a carbon-to-carbon multiple bond, or reaction with alcohols, amines, or organometallic reagents, to give modified or crosslinked materials having use as molding compositions, photoresists, and precursors to ceramic materials.

In a further aspect, polymers containing silyl derivatives of Periodic Groups IA or IIA metals can be obtained either directly or by treatment of the isolated polyhydridosilanes with Periodic Groups IA or IIA metals. These are red, air-sensitive materials which are soluble in organic solvents, and which demonstrate chemistry typical of silyl derivatives of Periodic Groups IA or IIA metals. This reactivity, e.g. with amines, alcohols, thio groups, or carbon-to-halogen or transition metal-to-halogen bonds, can be used to give modified materials having utility as molding compositions, photoresists, and precursors to ceramic materials.

In a still further aspect, thermal treatment of the polyhydridosilanes of the present invention provides pyropolymers containing elemental silicon, silicon carbide, and/or carbon in either combined or elemental form and which are high temperature-stable materials. In yet a further aspect, the polyhydridosilane or the pyropolymer can be caused to react with a nitrogen source such as gaseous nitrogen or ammonia at elevated temperatures to form a new pyropolymer which additionally contains silicon nitride or Si—N bonds.

In the process of the invention, at least one hydridosilane is polymerized to form a polyhydridosilane wherein each silicon atom in the polymer preferably has at most one R group and 0 to 2 hydrogen atoms and is connected to 2 or 3 other Si atoms such that a valency of four for each silicon atom is maintained and such that the average number of hydrogen atoms per silicon is in the range of 0.3 to 2.2. R can be a hydrogen atom or an aliphatic or aromatic group having up to 25 carbon atoms. A mixture of hydridosilanes can be copolymerized to give polyhydridosilanes having aliphatic, aromatic, or a combination of aliphatic and aromatic groups in addition to hydride in the resultant polymer, or a hydridosilane can be copolymerized with silanes containing no hydride. The process of the invention provides organic solvent-soluble catenated silicon systems containing silicon-hydrogen bonds which can be prepared from silanes in a one-step process. In the prior art, tractable polysilanes were prepared from silanes, but the resultant polysilanes did not contain silicon-hydrogen bonds, unless they were introduced in subsequent steps. Further, it is believed that tractable polyhydridosilanes having at least 9 catenated silicon atoms and an average in the range of 0.3 to 2.2 hydrogen atoms per silicon atom are novel.

Pyrolysis of the resulting polyhydridosilanes of the invention provides (1) pyropolymers containing elemental silicon which can be useful in electronic and electro-optical applications, (2) pyropolymers containing silicon and silicon carbide which can be useful in electronic, ceramic, and other applications, and (3) pyropolymers containing silicon carbide which can be useful in ceramics and photovoltaics. Further, pyrolysis in the presence of a nitrogen source results in silicon nitride-containing pyropolymers which may be used as abrasives and ceramics.

In the present invention:

"catenated" means a joined silicon-silicon backbone which can be linear, branched, cyclic, or combinations thereof, and the valence of each silicon atom is four;

"oligomer" means a compound containing 2, 3, or 4 monomer units;

"polymer" means a compound containing more than 4 monomer units;

"film-forming" means sufficiently soluble in a common volatile organic solvent such as toluene, tetrahydrofuran, or dichloromethane to enable a coating to be deposited by conventional coating techniques such as knife coating or bar coating; generally, a solubility of polyhydridosilane as low as 0.1 gram in 100 grams of organic solvent at 20° C. is useful, although a solubility of at least 1 gram is preferred;

"silicon hydride" or "hydride" means a hydrogen atom which is bonded directly to a silicon atom;

"silyl derivative of Periodic Groups IA and IIA" means a compound containing a silicon atom bonded to three groups preferably selected from hydrogen, aliphatic or aromatic group, or another silicon atom and containing a silicon-to-metal bond where the metal is a Periodic Group IA or IIA metal;

"silane" means a compound having the formula $SiA_1A_2A_3A_4$ where each of $A_1$ to $A_4$ may be chosen from alkyl, alkenyl, aryl, halogen, alkoxy, hydrogen or other radicals such as amino, cyano, and mercapto;

"hydridosilane" refers to a silane where at least one of $A_1$ to $A_4$ is hydrogen;

"polysilane" means a polymer containing a catenated silicon backbone with other atoms or groups pendant such as hydrogen, halogen, silicon, organic groups (optionally including hetero atoms), Periodic Group IA or IIA metals, or inorgano- or organometallic groups, such that each silicon maintains a valency of 4;

"polyhydridosilane" means polymers resulting from polymerization of at least one hydridosilane and having catenated backbones with an average number of hydride atoms per silicon atom in the range of 0.3 to 2.2;

"single bond connecting two silicon atoms" means that a single bond attaches a catenated silicon atom of one polymeric backbone to a silicon atom which may be on another polymeric backbone so as to effect a branchpoint, crosslink, or cyclic structure in the resulting polymeric chain;

"substantially crosslinked" means a three-dimensional polymeric network wherein the resultant polymer is no longer soluble;

"soluble" means that a finite amount of a compound can be dissolved in a particular solvent to give a solution; i.e., the solution contains at least 0.1 gram of polyhydridosilane, and preferably 1.0 gram, dissolved in 100 grams of organic solvent such as tetrahydrofuran, toluene, methylene chloride, etc. at 20° C., or in the case of a dispersion it will pass through a 10 to 15 micrometer fritted glass filter medium;

"tractable" means having properties such as solubility, volatility and/or extrudability to an extent that allows study and processing;

"pyropolymer" means a stable polymer produced by thermal treatment of polymers wherein crosslinking occurs;

"catenary" means in the backbone, not a terminal or pendent group;

"elemental carbon" means any of the allotropic forms of carbon; and

"organometallic group" means a group containing carbon to metal bond.

DETAILED DESCRIPTION

The present invention comprises a polymer having a backbone comprising repeating monomeric units having the formula:

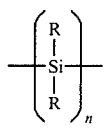

wherein
all R's may be the same or different and are independently selected from the group consisting of (1) hydrogen, (2) a linear, branched, or cyclic aliphatic group (preferably alkyl or alkenyl) having 1 to 10 carbon atoms and optionally containing at least one Periodic Group VA or VIA atom which is preferably selected from oxygen and nitrogen, (3) an aromatic group [preferably aryl, aralkyl, or alkaryl group (wherein aryl preferably is a single ring, such as phenyl, benzyl, tolyl, or a fused ring, such as naphthyl)], all of these groups optionally substituted by up to three $C_1$ to $C_{10}$ linear, branched, or cyclic aliphatic groups, said aromatic or aliphatic groups optionally containing at least one Periodic Group VA or VIA atom which preferably is selected from oxygen and nitrogen, the total number of carbon atoms being up to 25, (4) a single bond connecting two silicon atoms, (5) a metal atom selected from the group consisting of Periodic Groups IA and IIA, and (6) an inorgano- or organometallic group comprising at least one Periodic Group IB to VIIB, VIII, and Lanthanide and Actinide element;

wherein the ratio of hydride to silicon is in the range of 0.3 to 2.2; and the average number of monomeric units in the polymer is in the range of 9 to 4000, preferably 12 to 4000.

R can be an aliphatic or aromatic group capable of forming one or more bonds to one or more silicon atoms which group optionally can contain at least one atom of N, P, As, Sb, Bi, O, S, Se, and Te. These heteroatoms may or may not be bonded directly to a silicon atom which is part of a catenated system, e.g., alkoxy such as —OCH$_3$, arylalkylamino such as —N(CH$_3$)(C$_6$H$_5$CH$_2$), ether (catenary oxygen) such as —(CH$_2$)$_2$—O—CH$_3$, arylthio such as —S(C$_6$H$_5$), and alkylphosphino such as —P(C$_2$H$_5$)$_2$. Preferred R groups include hydrogen, methyl, ethyl, n-butyl, methoxy, phenyl, benzyl, benzylmethylamino, phenethyl, silicon, lithium, sodium, and iron (dicarbonyl)cyclopentadienyl.

The polymers of the invention, wherein the monomeric units may be randomly arranged, are film-forming and soluble in common organic solvents, have catenated silicon backbones, and are commonly referred to as polyhydridosilanes. They are also referred to in the art as polysilylenes and polysilanes. Polyhydridosilanes may have utility as precursors to pyropolymers. The polyhydridosilane can be coated as films, drawn into fibers, or utilized in bulk or as binders before pyrolysis.

Polyhydridosilanes of formula I, wherein n has an average value in the range of 9 to 4000, preferably 12 to 4,000, more preferably 20 to 2000, and most preferably 30 to 1000, have average molecular weights in the range of 350 to 500,000. Lower molecular weight polyhydridosilanes, i.e., where n has an average value of 9 to about 15, are liquids with high vapor pressures. They are more difficult to handle in air (i.e., they readily oxidize) than higher molecular weight polyhydridosilanes but they may be preferred in applications were appreciable volatility is desirable.

Hydridosilane monomers alone or in the presence of organosilanes polymerize in the method of the invention in one step to polyhydridosilanes. Polyhydridosilanes can be prepared by 1. providing a suitable hydridosilane having the general structure H(R$^1$)SiX$_2$, where R$^1$ is as defined above for R groups (1) to (4), except that R$^1$ groups chosen from R groups (2) to (4) must be sufficiently stable so as to be unreactive under the conditions of the reaction (preferably only catenary oxygen is present as a heteroatom), and wherein the hydridosilane preferably contains at most one aliphatic or aromatic group per silicon atom, and X is a halogen atom, preferably chlorine, and 2. reacting the hydridosilane above with a suitable Periodic Group IA (alkali) or Group IIA (alkaline earth) metal or alloy in an amount of at least 1 equivalent of metal per equivalent of halogen in an inert atmosphere such as argon or nitrogen and in an inert diluent such as tetrahydrofuran or toluene for a period of time sufficient to provide the desired polyhydridosilane.

Preparation of polyhydridosilanes according to the present invention may be illustrated by the following equation (1) (for a Group IA metal)

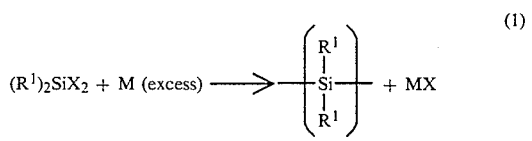

(1)

where R$^1$ is as defined above, and M is a Periodic Group IA or Group IIA metal or alloy. X is preferably chlorine but may be another halogen such as bromine or iodine or a combination of halogens. The monomeric units shown in equation 1 are repeating and may be randomly arranged in any proportion. There are from 9 to 4000 monomeric units in each polymer. The silicon-hydride bonds are not completely inert to the reaction conditions, and some of them react to form Si—Si bonds, with a hydride to silicon ratio in the range of 0.3 to 2.2. The positions along the catenated silicon backbone where the hydride has reacted contain silicon atoms bonded to three or four other silicons, so that a valency of four is maintained and may be branch points, parts of a cyclic structure or crosslinks. When one R$^1$ is selected from aliphatic or aromatic groups the R$^1$—Si bond is inert to the reaction conditions, and thus each silicon in the polymer will be bonded to two or three other silicons, one R$^1$ and zero or one H. When one R$^1$ is hydrogen, the R$^1$—Si bond is no longer inert to the reaction conditions, and each silicon atom may now be bonded to two, three or four other silicon atoms and two, one or no H atoms, such that a valency of four is maintained for each silicon atom.

Examples of hydridosilanes $H(R^1)SiX_2$ which may be used as starting materials in the present invention include methyldichlorosilane, ethyldichlorosilane, phenyldichlorosilane, dichlorosilane, and the like. The invention is not intended to be limited to these particular starting material silanes.

The polymers of the invention are soluble in organic solvents such as tetrahydrofuran, toluene, methylene chloride and the like, forming solutions of at least 0.1 gram in 100 grams of organic solvent and preferably 1.0 gram per 100 grams of solvent. Many of the polymers are even more soluble than that, the solutions of 10 grams or more per 100 grams of organic solvent can be obtained. This distinguishes them from materials of similar composition in the prior art, in that those materials are insoluble. Solubility is a desirable property, in that it allows convenient study and handling of these materials. Those skilled in the art will appreciate that this property can allow the polymers to be cast into films and fibers, further modified chemically in homogeneous reactions, conveniently analyzed, or otherwise manipulated or formed.

The polyhydridosilanes of the invention are white or pale yellow, and may be transparent or translucent or opaque. They may be air-sensitive or stable in air, depending on the substituents R; generally, electron-withdrawing groups R yield a material which is more air-stable than those materials with electron-donating groups.

Copolymers of hydridosilanes can be prepared by the reaction of a mixture of different hydridosilanes with a suitable metal. For example, an aliphatic-substituted hydridosilane with an aromatic-substituted hydridosilane can be caused to react with a metal such as sodium to yield a random copolymer comprised of randomly repeating units of an alkyl-substituted hydridosilane with randomly repeating units of an aryl-substituted hydridosilane. This reaction may be exemplified by the general equation

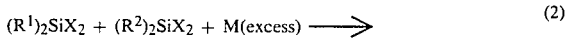

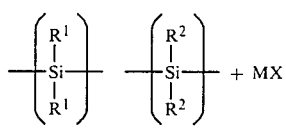

where $R^1$ and $R^2$ may be the same or different and are independently selected from R groups (1), (2), (3), and (4), and M, and X all are as defined and restricted above, and $R^1$ and $R^2$ are not all alike. The monomeric units shown in equation 2 may be randomly arranged, and there are from 9 to 4000 monomeric units in each polymer. As was described above, the Si—H bonds are not inert to the reaction conditions, and the polymer contains a hydride to silicon ratio of from 0.3 to 2.2, with a valency of four being maintained for each silicon atom. Hydridosilanes may also be copolymerized in a similar manner with silanes containing no hydrogen on the silicon atoms. The metal with which the hydridosilane is treated may be a Group IA metal such as lithium, sodium, potassium or alloys or combinations thereof or a Group IIA metal such as magnesium which will reduce silicon-halogen bonds. At least one metal equivalent per equivalent of halide is used. A temperature in the range of $-78°$ to $150°$ C. can be utilized. Other reducing conditions and techniques, such as electrolysis, are also suitable. Reaction times are sufficient, depending on temperature, to allow the silicon-halogen bonds to react and form the polyhydridosilane.

Equations 1 and 2 are intended only as examples, and it is not intended that the invention be limited to these particular combinations.

Reactions of the present invention can proceed readily under mild conditions (i.e., $-78°$ to $40°$ C.) without the necessity of using elevated temperatures. As with any reaction involving the use of alkali metals and/or silicon halides, the reaction is performed under anhydrous conditions in the absence of reactive oxygen in an inert atmosphere, such as nitrogen or argon.

The reaction may be carried out in any suitable solvent or vehicle which does not adversely affect the reactants or products, and tetrahydrofuran as solvent is particularly suitable. Other solvents which are suitable and in which the resultant colorless or lightly colored polyhydridosilanes are soluble are 1,2-dimethoxyethane (glyme), and toluene.

Useful catalysts to increase the rate of reaction of hydridosilanes with the previously mentioned metals include naphthalene and other polynuclear aromatics. In the case where a dihydridosilane is used, naphthalene as catalyst is particularly desirable because it allows the reaction to proceed under very controlled conditions (i.e., temperatures in the range of $-78°$ to $-40°$ C.) which avoids formation of a substantial number of crosslinks and the production of insoluble materials. A stoichiometric amount of catalyst can be used, but preferably an amount in the range of 0.01 to 5.0 mole percent per hydrosilane compound and most preferably 0.1 to 1.0 mole percent is employed.

Upon mixing of a hydridosilane and a Periodic Group IA or IIA metal, or combinations or alloys thereof, an exotherm is observed. The resulting polyhydridosilanes, which are the precursors to the pyropolymers of the invention, can then be isolated and stored as long as they are kept free from moisture and oxygen, i.e., they are kept in an inert atmosphere in the absence of light at 25° C. or less. The polyhydridosilanes are soluble in common organic solvents such as toluene, tetrahydrofuran, glyme, and dichloromethane.

In another aspect of the invention, silyl derivatives of Periodic Groups IA and Group IIA metals may be formed from Si—X (where X=halogen), Si—H, Si—Si or catenated silicon systems by several mechanisms. Under appropriate reaction conditions (preferably, sufficient reaction time in the presence of a sufficient quantity of Periodic Groups IA or IIA metal M, preferably sodium, potassium, lithium, or magnesium), a polymer containing silyl derivatives of metals M may be obtained in a one-step synthesis using more than 1 equivalent of metal per equivalent of halogen. Alternatively, one can allow polyhydridosilanes of formula I to react with M metals in an amount of 0.01 to 5 equivalents of metal per equivalent of hydride in an appropriate solvent under inert atmosphere and obtain silyl derivatives of the metal in this manner. Materials prepared by either method demonstrate the reactivity expected of silyl-M compounds such as reaction with an aliphatic or aromatic halide or a transition metal halide complex:

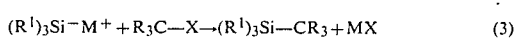

$$(R^1)_3Si^-M^+ + TX_nL_m \rightarrow (R^1)_3Si-TX_{(n-1)}L_m + MX \quad (4)$$

$$(R^1)_3Si^-M^+ + CuCl \rightarrow (R^1)_3Si-Si(R^1)_3 + Cu + MCl \quad (5)$$

where R, $R^1$, M and X are as defined above. A transition metal halide complex is represented by $TX_nL_m$ where T can be selected from one or more of Ti, Zr, Hf, V, Nb, Ta, Cr, Mo, W, Mn, Re, Fe, Ru, Os, Co, Rh, Ir, Ni, Pd, Pt, or Actinide or Lanthanide metal, X can be a halogen (Cl, Br, or I), n can be an integer from one to five; L can be independently selected from one or more of the following groups: (1) an aliphatic or aromatic group containing one or more carbon-to-carbon multiple bonds such as ethylene, diphenylacetylene, benzene, cyclooctadiene, cyclopentadienyl, and toluene; (2) a group containing one or more Periodic Group VA atoms optionally substituted with up to 4 groups independently selected from aliphatic and aromatic, and a hydrogen atom, such as ammonia, trimethylamine, triphenylphosphine, trimethylphosphine, dimethylphenylphosphine, tetramethylammonium, triphenylarsine, and 1,2-bis(diphenylphosphino)ethane; or the Group VA atom or atoms may be part of an aromatic group, such as pyridine or 2,2'-bipyridyl, or the Group VA atom may be multiply bonded to carbon and optionally substituted with at least one aliphatic or aromatic group, such as cyano, acetonitrile, or t-butylisocyanide; (3) a group containing one or more Group VIA atoms optionally substituted by up to 5 groups independently selected from aliphatic and aromatic groups, or a hydrogen atom, such as tetrahydrofuran (THF) or, the Group VIA atom(s) may be multiply bonded to carbon and optionally substituted with at least one aliphatic or aromatic group, such as acetylacetonate, (4) $R^1$, where $R^1$ is as defined above, such as $CH_3$, t-butyl, or phenyl (5) CO; and wherein m is selected depending on L so as to achieve a stable compound, generally, an 18 electron configuration, or for metals such as Rh, Ir, Ni, Pd, and Pt, a 16 electron configuration may be stable. Generally, m can be an integer in the range of 1 to 6.

Examples of stable inorgano- and organometallic compounds are:
(1) $(Cp)_2TX_2$, where T can be Ti, Zr, Hf; X can be Cl or Br; and Cp=cyclopentadienyl;
(2) $CpT(CO)_pX$, where T can be Cr, Mo, W, where p=3, and X can be Cl or Br; or T can be Fe, Ru, Os, where p=2, and X can be Cl or Br;
(3) $[(R^1)_3P]_2TX_2$ or $[(R^1)_3P]_2TX(R^1)$, where T can be Ni, Pd, Pt, and X can be Cl, Br, or I;
(4) $CpT(CO)X_2$ or $CpT(CO)X(R^1)$ where T can be Co or Rh; X can be Cl;
(5) $[C_5(CH_3)_{10}]_2TX$, where T can be Lu or Y;
(6) $(NH_3)_2PtCl_2$; $(CO)_qTX$, where T can be Co, Rh, or Ir; q=4 and X can be Cl or Br; or where T can be Mn or Re, q=5, and X can be Cl or Br; $(Co)_rTX_2$, where T can be Fe, Ru, Os, r=4, and X can be Cl or Br.

Other suitable compounds may be found in many reference on inorgano- or organometallic chemistry. In Equations 3, 4 and 5 above, one or more of R is a single bond connecting two silicon atoms, so that $R_3Si^-Na^+$ represents part of the polyhydridosilane-containing silyl derivative of Periodic Groups IA or IIA.

The polyhydridosilanes derivatized with Periodic Groups IA or IIA metal remain reactive for long periods of time, so long as they are protected from moisture or other reagents, that is, as long as they are stored under inert atmosphere. Monomeric units, for example, having the formula

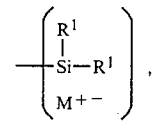

wherein $R^1$ and M are as defined above, are present in the polymer and under appropriate conditions remain active and have the capability of reacting with groups such as alkyl halides, transition metal halides, or an oxidizing agent such as copper (I) chloride. It is not intended that the invention be limited to these particular examples of silyl-M reactivity.

In a further aspect of the invention, the Si—H bond in the polyhydridosilanes described by formula I may be further reacted with reagents other than Periodic Groups IA or IIA metals. The following examples illustrate this reactivity:

polyhydridosilane with an alcohol:

$$(R^1)_3Si-H + ROH \rightarrow (R^1)_3SiOR + H_2 \quad (6)$$

polyhydridosilane with an amine:

$$(R^1)_3Si-H + R_2NH \rightarrow (R^1)_3Si-NR_2 + H_2 \quad (7)$$

polyhydridosilane with an alkene:

$$(R^1)_3Si-H + R_2C=CR_2 \xrightarrow{\text{catalyst}} (R^1)_3Si-CR_2-CR_2-H \quad (8)$$

$$(R^1)_3Si-H + R_2C=CR_2 \xrightarrow{\text{catalyst}} \quad (9)$$

substantially crosslinked network $$R_3Si-H + R_2C=CR_2 \xrightarrow{\text{photolysis}} \quad (10)$$

substantially crosslinked network polyhydridosilane with an inorgano- or organometallic Periodic Group IA or IIA compound:

$$(R^1)_3Si-Si(R^1)_3 + M-R^2 \rightarrow (R^1)_2(R^2)Si-Si(R^1)_3 + (R^1)_3Si-M^+ \quad (11)$$

In equations 6, 7, 8, 9, 10 and 11, R, $R^1$, $R^2$, and M are as defined above (and chosen so that $(R^1)_3Si-H$ represents part of the polyhydridosilane). In equations 9 and 10, at least one of R is chosen so that $R_2C=CR_2$ represents a polyfunctional compound such as divinylbenzene. Other polyfunctional compounds containing groups selected from alcohols, amines, and alkenes, such as ethylene glycol, ethylenediamine, ethanolamine, and diallylamine, are also suitable for forming substantially crosslinked networks.

The polyhydridosilanes and derivatives thereof of the present invention may contain a variety of reactive sites, such as Si—H bonds, Si—Si bonds and Si—R bonds (depending on R), and others (for example, when R=alkenyl). Those skilled in the art will realize that under certain reaction conditions, the polyhydridosilanes may demonstrate more than one type of reactivity, that is, that two or more reactions may occur at different reactive sites under a certain set of conditions. Such multiple reactivity may be represented, for example, in Equations 10 and 11 (where the proportions of each of the several reactions may vary). Multiple reactivity may be desirable in certain applications.

These examples are meant to serve as illustration only, and the invention is not intended to be limited to these particular reactions of Si—H bonds.

In accordance with the present invention, pyrolysis of th polyhydridosilanes of formula I above, or their derivatives as disclosed above, preferably in a vacuum or in an inert atmosphere, yields pyropolymers, which, depending on the composition of the polyhydridosilane and on pyrolysis conditions, contain at least one of silicon, silicon carbide, or carbon. Other multivalent elements, such as transition metals, oxygen and nitrogen, may be incorporated by selecting a suitably derivatized polyhydridosilane. Varying the pyrolysis conditions also results in variation in the molecular weight of the pyropolymers due to changes in crosslinking. Pyrolysis conditions determine, to some extent, the degree of crystallinity of the resulting pyropolymer.

In another aspect of the present invention the polyhydridosilane or pyropolymer may be pyrolyzed in the presence of a gaseous nitrogen source, such as ammonia, and under appropriate conditions silicon nitride may result.

Pyrolysis of the aforementioned polyhydridosilanes is conducted over a temperature range of 200° to 2000° C., preferably 600° to 1600° C., in an inert atmosphere such as argon or in a vacuum until the pyropolymer having the desired properties is formed. If it is desired to prepare a silicon nitride-containing pyropolymer, a nitrogen source, such as gaseous ammonia, nitrogen, hydrazine, methylamine, or ammonium halide is subsequently introduced over a temperature range of 700°–2000° C. If more crystallinity is desired, higher pyrolysis temperatures and longer times are utilized.

Generally, pyrolysis is not observed below 200° C. and a practical upper temperature is 1600° C. Above 1200° C., morphological changes to the more crystalline forms of silicon, silicon carbide, silicon nitride, and carbon (graphite) can be anticipated.

The physical and chemical character of the pyropolymer obtained is dependent upon the form and composition of the polyhydridosilane or copolymeric polyhydridosilane, the temperature of pyrolysis, and whether a gaseous nitrogen source is used during pyrolysis. Polyhydridosilanes as films, fibers, bulk samples, and articles can be pyrolyzed to prepare pyropolymers which can be films, fibers, bulk samples or articles. The Si/H ratio increases with increasing temperature.

Pyropolymers find use, depending on their composition, in a variety of applications. Silicon carbide-containing pyropolymers, for example, are used as ceramic materials and as abrasives, and silicon-containing pyropolymers find use as photoconductive materials. Silicon nitride-containing pyropolymers are useful as abrasives and structural ceramics. Other uses of pyropolymers may be apparent to those skilled in the art and are not limited to those uses stated herein.

As mentioned above, the polyhydridosilanes of the invention (prior to pyrolysis) are useful as films, fibers, or articles in applications such as photoresists, coatings, and composites for modification of surfaces, as elastomers or adhesives, as well as precursors for pyropolymers.

Objects and advantages of this invention are further illustrated by the following examples, but the particular materials and amounts thereof recited in these examples, as well as other conditions and details, should not be construed to unduly limit this invention. In all cases each silicon atom has a valency of four. Where a hydrogen, an aliphatic, or an aromatic group or other group is not indicated, the valency is completed by bonding to one or more other silicon atom or atoms, as required.

EXAMPLE 1

This example illustrates the preparation of poly(phenylhydridosilane). The entire preparation was conducted in an inert atmosphere of nitrogen unless indicated otherwise.

To seven grams of a magnetically stirred mixture of mineral oil-free sodium dispersion (from Alfa Products, Ventron Division of Thiokol Corp., Danvers, MA) washed free of mineral oil with dry, oxygen-free hexanes in a nitrogen atmosphere, and covered with 150 ml of dry, oxygen-free tetrahydrofuran (THF), 20 ml of phenyldichlorosilane (Petrarch Systems, Inc., Bristol, PA) (the silane was vacuum-distilled before use) was added dropwise over 1.5 hrs. at ambient temperature (about 20° C.). The product was stirred for three days and the resultant red mixture was filtered to remove excess sodium dispersion and NaCl. To the filtrate was added 5 g of copper (I) chloride and the mixture was magnetically stirred for one day. The now yellow solution was filtered and tetrahydrofuran (THF) was removed under reduced pressure from the filtrate to leave 10.9 g of pale yellow solid polymer. Spectroscopic analysis indicated the composition of the solid to have the following formula:

$$[Si(C_6H_5)H]_{0.51}[Si(C_6H_5)]_{0.49}$$

so that a valency of four is maintained. This polymer was handled briefly in air as a solid without significant change.

EXAMPLE 2

This example illustrates the preparation of poly(methylhydridosilane) following the procedure outlined in EXAMPLE 1.

To 10 g of a magnetically stirred and mineral oil-free sodium dispersion covered with 150 ml of THF was added dropwise at room temperature over 2 hrs. 20.8 ml of vacuum-transferred methyldichlorosilane (Petrarch Systems, Inc.). The reaction mixture was stirred for four days at about 20° C. and filtered in a nitrogen atmosphere. Removal of solvent from the filtrate left 4.7 g of pale yellow solid. Spectroscopic analysis indicated the solid corresponded to the composition $$[Si(CH_3)H]_{0.36}(Si(CH_3))_{0.64}.$$

This polymer reacted readily with air, with the formation of Si—O bonds.

EXAMPLE 3

This example illustrates the preparation of a random copolymer of an alkylhydridosilane with an arylhydridosilane following the procedure outlined in EXAMPLE 1.

To a magnetically stirred mixture of 1.61 g of mineral oil-free sodium dispersion covered with 50 ml of THF was added dropwise over 15 minutes at about 20° C. a solution of 1.73 g of purified methyldichlorosilane and 2.65 g of purified phenyldichlorosilane in 5 ml of THF. The product was stirred at about 20° C. for two days and processed according to the procedure in EXAMPLE 2. Removal of solvent from the filtrate left 1.8 g of pale yellow solid polymer. Spectroscopic analysis indicated the solid corresponded to the composition:

$$[Si(CH_3)H]_{0.22}[Si(CH_3)]_{0.4}[Si(C_6H_5)H]_{0.37}[Si(C_6H_5)]_{0.01}.$$

This polymer was handled briefly in air as a solid, without significant change.

The copolymer was heated under nitrogen at 10° C. min$^{-1}$ from ambient to 1000° C. Minor weight loss began at 160° C. The main thermogravimetric change occured in the 240°–480° C. region and was complete by 540° C. Total weight loss was about 50 percent, in contrast to the report by Yajima et al. (U.S. Pat. No. 4,283,376) who show a nearly complete weight loss of poly(dimethylsilane) under similar conditions.

EXAMPLE 4

This example illustrates the preparation of poly(hydridosilane) following the procedure outlined in EXAMPLE 1.

Sodium metal (23 g, cut into about twenty pieces) was covered with 600 ml of THF and 100 mg of naphthalene was added. The green color typical of sodium naphthalide soon formed. The sodium-containing mixture was cooled by means of an external liquid nitrogen bath and 27 ml of dichlorosilane (Petrarch Systems Inc., vacuum transferred from 0° C.) was condensed into the frozen sodium mixture. It was then warmed to −40° C. and maintained at −40° C. for about four days. The reaction mixture was then warmed to ambient temperature and promptly filtered under nitrogen. Removal of solvent from the filtrate left a gummy white solid which was mixed with 300 ml of toluene to dissolve the polymer. The resultant mixture was filtered and the toluene was removed under vacuum from the filtrate to leave 0.7 g of a cream colored solid poly(dihydridosilane) whose spectroscopic analysis indicated the presence of a silicon to hydrogen ratio of 1 to 1.9 and confirmed the presence of SiH$_2$ groups. This polymer reacted readily but not violently with air.

NOTE: Dichlorosilane is a highly reactive gas and may contain SiH$_4$, which reacts explosively with air. Additionally, storage of the polysilane (SiH$_{1.9}$)$_n$ in the presence of impurities may result in disproportionation and formation of SiH$_4$. Appropriate precautions should therefore be observed throughout these procedures.

EXAMPLE 5

This example illustrates the preparation of poly(ethylhydridosilane) following the procedure outlined in EXAMPLE 1.

To 10.0 g of sodium (cut into about ten pieces) covered with 250 ml of THF, and containing 90 mg of naphthalene, and cooled with an external liquid nitrogen bath was added by vacuum transfer 10.0 g of ethyldichlorosilane (Petrarch Systems, Inc.). The reaction mixture was warmed to about 20° C., stirred for 3 days at about that temperature, and filtered in a nitrogen atmosphere. Solvent was removed from the filtrate under vacuum to yield 2.90 g of pale yellow oil. Spectroscopic analysis indicated the oil corresponded to the composition $$[Si(C_2H_5)H]_{0.79}[Si(C_2H_5)]_{0.21}.$$

This polymer reacted readily with air.

EXAMPLE 6

This example illustrates the preparation of a random copolymer of a dialkylsilane and a dihydridosilane following the procedure outlined in EXAMPLE 1.

To a flask containing 11.5 g of sodium (cut into approximately 10 pieces), 100 mg of naphthalene, and 250 ml of THF and cooled in liquid nitrogen as an EXAMPLE 4 was added 8.3 ml of purified dichlorosilane and 12.1 ml of purified dimethyldichlorosilane (Petrarch Systems Inc.). The mixture was warmed to −40° C. and maintained at that temperature for one week. It was then warmed to room temperature, and promptly filtered in a nitrogen atmosphere. Removal of solvent from the filtrate gave 2.2 g of viscous cream-colored oil. Spectroscopic analyses indicated the oil corresponded to the composition:

$$[Si(CH_3)_2]_{0.36}[(SiH)(SiH_2)]_{0.64}.$$

and confirmed the presence of (SiH$_2$) groups.

This polymer reacted readily with air.

EXAMPLE 7

This example illustrates the preparation of a random copolymer of an alkylarylsilane and an arylhydridosilane following the procedure outlined in EXAMPLE 1.

To a flask containing 4.7 g of sodium (cut into approximately 5 pieces) and 50 ml of THF was added dropwise over 5 min a mixture of 7.3 g of phenyldichlorosilane and 7.8 g of phenylmethyldichlorosilane (Petrarch Systems, Inc., Bristol, PA) (both silanes were vacuum-distilled before use) at ambient temperature (about 20° C.). The reaction mixture was stirred for 8 days, and the resultant red solution was filtered to remove excess sodium and NaCl. The deep red filtrate was placed over 7.4 g of CuCl, and stirred overnight. The mixture was then filtered to remove excess CuCl, Cu an NaCl, and THF was removed from the filtrate under vacuum to give 8.0 g of pale yellow polymer. Spectroscopic analysis indicated the solid corresponded to the composition:

$$[Si(C_6H_5)(CH_3)]_{0.55}[Si(C_6H_5)H]_{0.38}[Si(C_6H_5)]_{0.07}$$

This polymer was handled briefly in air as a solid, without significant change.

This polymer was further fractionated by the following procedure: 8.0 g of polymer was dissolved in approximately 15 ml of toluene, and added dropwise to 200 ml of hexanes, with stirring. A white powder formed, which was collected by filtration to give 0.9 g of a white solid polymer. The solvent was removed from the filtrate to give 6.6 g of very gummy pale yellow polymer.

EXAMPLE 8

This example illustrates the preparation in one step of poly(phenylhydridosilane) containing a silyl derivative of sodium following the procedure outlined in EXAMPLE 1.

To 2.5 g of sodium, cut into approximately five pieces and covered with 75 ml of THF, 12.2 g of phenyldichlorosilane was added dropwise over several minutes.

The reaction mixture was stirred for four days until a deep red solution formed. The reaction mixture was filtered to remove excess sodium and NaCl, and THF was removed from the filtrate under vacuum to give 7.2 g of deep red solid polymer Spectroscopic and elemental analyses confirmed the composition of the solid to have the following composition:

$[Si(C_6H_5)H]_{0.40}[Si(C_6H_5)]_{0.60}[Na]_{0.17}$

This polymer reacted readily with air, although it was stable for months when stored as a solid under an inert atmosphere.

EXAMPLE 9

This example illustrates the preparation in one step of poly(methylhydridosilane) containing a silyl derivative of sodium following the procedure outlined in EXAMPLE 1.

To 10 g of sodium covered with 150 ml THF, 23 g of methyldichlorosilane was added dropwise at ambient temperature over 2 hr. The reaction mixture was stirred for five days at about 20° C. when a deep red solution had formed. The reaction mixture was filtered through a fine porosity glass frit (4-8 micrometers, dried at 120° C. and placed in an inert atmosphere while hot) to remove excess sodium and NaCl, and THF was removed from the filtrate under vacuum to give 6.6 g of a deep red solid polymer. Spectroscopic and elemental analyses confirmed the solid to have the following composition:

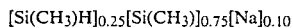

$[Si(CH_3)H]_{0.25}[Si(CH_3)]_{0.75}[Na]_{0.10}$

This polymer reacted readily with air, although it was stable for months when stored as a solid under an inert atmosphere.

EXAMPLE 10

This example illustrates the preparation of a copolymer of an alkylarylsilane and an arylhydridosilane containing a silyl derivative of sodium in one step following the procedure outlined in EXAMPLE 1.

To a flask containing 3.7 g of sodium (cut into approximately 4 pieces) and 50 ml of THF was added dropwise over 5 min a mixture of 5.7 g of phenyldichlorosilane and 6.1 g of phenylmethyldichlorosilane at ambient temperature (about 20° C.). The reaction mixture was stirred for eight days, and the resultant red solution was filtered to remove NaCl and excess sodium. Solvent was removed from the filtrate under vacuum to give 6.2 g of deep red solid. This material was dissolved in 15 ml of toluene and precipitated into 250 ml of stirred hexanes, to produce 2.3 g of bright yellow powder. Subsequent reactions and spectroscopic analyses indicated the solid corresponded to a composition containing 5 mole percent silyl derivative of sodium.

EXAMPLE 11

This example illustrates the preparation of a random copolymer of an alkylarylsilane and an arylhydridosilane containing a silyl derivative of sodium in two steps following the procedure outlined in EXAMPLE 1.

First, 4.6 g of phenyldichlorosilane and 5.0 g of phenylmethyldichlorosilane were reacted with 3.0 g of sodium (cut into about 3 pieces) in 40 ml of THF, filtered, treated with 3.1 g of CuCl and filtered to produce a pale yellow filtrate containing a random copolymer of phenylmethylsilane and phenylhydridosilane as in EXAMPLE 7. Second, the solvent was not removed from the polymer, but the filtrate was placed over 1.8 g of sodium, and the solution began to turn red within minutes. The reaction mixture was stirred for approximately 3 hours, then allowed to stand for 20 hours. The reaction mixture was filtered, and solvent removed under vacuum to produce 5.1 g of deep red solid polymer. This was further treated by dissolution in 15 ml of toluene and precipitation into well-stirred hexanes (200 ml) to produce 3.3 g of bright yellow powder. This was collected by filtration and dried under vacuum. Subsequent reactions and spectroscopic analyses indicated the solid corresponded to a composition containing approximately 8 mole percent silyl derivative of sodium.

EXAMPLE 12

This example illustrates the reaction of a polyhydridosilane containing a silyl derivative of sodium with a compound containing a carbon-halogen bond.

To 135 mg of poly[(phenylmethylsilane)(phenylhydridosilane)] containing a silyl derivative of sodium prepared as in EXAMPLE 10 and dissolved in 0.5 ml of benzene-$d_6$ (Aldrich Chemical Co., Milwaukee, WI) was added 8 microliters of benzyl chloride. The red color of the silyl derivative of sodium disappeared immediately, and spectroscopic analyses indicated the presence of Si—$(CH_2C_6H_5)$ groups in the polymer. In this particular reaction, some deuterium was also incorporated into the polymer.

In a similar reaction using the polyhydridosilane containing silyl derivative of sodium (prepared as in EXAMPLE 11) suspended in hexanes and treated with benzyl chloride, Si—$(CH_2C_6H_5)$ groups were again formed but no evidence of reaction with solvent was obtained.

EXAMPLE 13

This example illustrates the reaction of a polyhydridosilane with an alkene in the presence of a platinum complex known to be a hydrosilation catalyst.

95 mg of poly(phenylhydridosilane) prepared as in EXAMPLE 1 was placed in 300 mg of benzene-$d_6$ with 180 mg of styrene and 1 mg of $H_2PtCl_6$. Within 24 hr of reaction spectroscopic analyses indicated the presence of $SiCH_2CH_2(C_6H_5)$ groups as well as some unreacted Si—H bonds.

EXAMPLE 14

This example illustrates the reaction of a polyhydridosilane with a polyalkene in the presence of a platinum complex known to be a hydrosilation catalyst to form a highly crosslinked network.

0.31 g of poly(phenylhydridosilane) (prepared as in EXAMPLE 1) was dissolved in 0.21 g divinylbenzene to form a very viscous mixture. 5 microliters of a solution containing 15 weight percent of a platinum complex with symmetrical divinyltetramethyldisiloxane was added. Within 24 hr of reaction, the sample was very hard and brittle. A control sample containing no platinum catalyst was still very soft.

EXAMPLE 15

This example illustrates the reaction of a polyhydridosilane with an alcohol.

100 mg of poly(phenylhydridosilane) prepared as in EXAMPLE 1 was placed in 1 ml of toluene, and 32 microliters of dry methanol was added. No reaction occurred. 1 mg of sodium metal was added as catalyst and within minutes of reaction spectroscopic analyses indicated the presence of Si—$OCH_3$ groups, and some unreacted Si—H bonds.

In another sample, 100 mg of poly(phenylhydridosilane) and 10 microliters of dry methanol were placed in 1 ml of THF, and 6 mg of 5 weight percent platinum on charcoal was added as catalyst. Within 24 hr of reaction, spectroscopic analyses indicated the presence of Si—$OCH_3$ groups, and some unreacted Si—H bonds.

If a large excess of alcohol is present and under appropriate reaction conditions, Si—Si bond cleavage may also occur.

EXAMPLE 16

This example illustrates the reaction of a polyhydridosilane with an amine.

To a solution of 100 mg of poly(phenylhydridosilane) (prepared as in EXAMPLE 1) in 1 ml of toluene was added 50 microliters of N-benzylmethylamine. Within minutes of reaction, spectroscopic analyses indicated the presence of Si—$N(CH_3)(CH_2C_6H_5)$ groups. Some Si—H bonds remained unreacted.

EXAMPLE 17

In this example a mixture of polyhydridosilane and polyvinyl compound were photochemically cross-linked.

150 mg of poly(methylhydridosilane) (prepared as in EXAMPLE 2) was dissolved in 220 mg of divinylbenzene. The solution was stored at 20° C. in the dark for a week with no change. The sample was then placed under an ultraviolet lamp, and within 15 hr a hard, brittle resin had formed.

EXAMPLE 18

This example illustrates the reaction of polyhydridosilane containing a silyl derivative of sodium with a transition metal halide.

Equivalent amounts of poly(phenylhydridosilane) containing a silyl derivative of sodium (prepared as in Example 8) and cyclopentadienylirondicarbonyl bromide were placed in THF. Reaction was immediate, and spectroscopic analyses confirmed the presence of Si—$Fe(CO)_2(C_5H_5)$ groups.

EXAMPLE 19

This example illustrates the reaction of a polyhydridosilane with an organometallic Periodic Group IA compound.

150 mg of poly(phenylhydridosilane) prepared as in EXAMPLE 1 was placed in 1.5 ml of THF. 0.5 ml of 2.5M n-butyl lithium in hexane (Aldrich Chemical Co., Milwaukee, WI) was added, and the reaction mixture immediately turned orange. Chemical and spectroscopic analyses indicated that reaction had occurred at both Si—H and Si—Si bonds, and that Si—$(C_4H_9)$ and Si$^-$Li$^+$ groups had formed.

EXAMPLE 20

This example illustrates the thermal treatment (pyrolysis) of poly(hydridosilane) to pyropolymer.

The poly(hydridosilane) was sensitive to air and all operations with this polymer were conducted in a nitrogen atmosphere.

Poly(hydridosilane), prepared as described in EXAMPLE 4, and protected by storage in nitrogen, was dissolved in dry, oxygen-free THF to give a solution (0.1 g of polymer in 1 g of THF). A few drops of this solution were placed on a sodium chloride (salt) plate, and the solvent was then removed under vacuum to give an adherent film having strong infrared (IR) absorptions. The film (on the salt plate) was placed within a larger, nitrogen-filled infrared cell such as a gas cell to allow an IR spectrum of the film to be obtained. The IR showed absorption bands due to the Si—H and $SiH_2$ groups. The film (on the salt plate) was placed in a quartz tube and heated under vacuum at 200° C. for one hour. Thereafter, this plate was allowed to cool, and its IR spectrum was taken (nitrogen atmosphere). No significant change was noted in the IR spectrum.

After heating of the above film (on the salt plate) at 400° C. for one hour, the absorption bands had almost disappeared and had shifted to lower wavelengths. After heating at 600° C. for one hour, the sample was black and infrared absorption bands were no longer visible.

EXAMPLE 21

This example illustrates the pyrolysis of aliphatic, poly(methylhydridosilane) to a pyropolymer.

The conversion of the polysilanes to pyropolymers and ultimate ceramic products was monitored by vacuum pyrolysis techniques. Poly(methylhydridosilane) (100 mg, 2.27 mmoles), prepared as in EXAMPLE 2, was heated under vacuum at 10° C. min$^{-1}$ with careful monitoring of the volatile products and visual observation of color change. The non-condensable gases were removed continuously, collected in a Toepler pump, and the cumulative total for each 100° C. increment was recorded before analysis by mass spectrometry to determine the ratio of $CH_4$:$H_2$ (Table I). Volatile compounds condensing in a liquid nitrogen trap were analyzed by infrared and mass spectrometry and the final ceramic residue (pyropolymer) was subjected to X-ray, Electron Spectroscopy for Chemical Analysis (ESCA), and Scanning Electron Microscopy (SEM) evaluation. By 430° C. the polysilane had become bright yellow with production of $CH_4$ (0.04 mmoles), $H_2$ (0.03 mmoles), and $SiH_3CH_3$ (0.29 mmoles). A clear colorless condensate, which collected just outside the hot zone of the furnace tube, had an IR spectrum identical to the starting polymer and was recorded as recovered oligomers and polymers.

TABLE I

| PYROLYSIS OF POLY(METHYLHYDRIDOSILANE) | | | |
|---|---|---|---|
| Temperature °C. | Color | Total Gas (mmoles) each interval | Composition (wt %) |
| | | | $CH_4$ | $H_2$ |
| 430 | Bright Yellow | 0.067 | 61 | 39 |
| 510 | Buff | 0.673 | 42 | 58 |
| 600 | Blue-black | 0.582 | 10 | 90 |
| 700 | Lustrous grey-black | 0.189 | 12 | 88 |
| 800 | Lustrous grey-black | 0.163 | 7 | 93 |
| 910 | Lustrous grey-black | 0.018 | 10 | 90 |

Summarizing, to indicate mass balance in mmoles:

$$[CH_3SiH]_n \xrightarrow{910°} H_2 + CH_4 + SiH_3CH_3 + \text{ceramic residue}$$

2.27
−0.60 (recovered oligomer)
―――
1.67         1.28   0.42         0.29         51.2 mg (70 wt %)

The above analysis figures imply that a significant amount of carbon, present as methyl groups in the starting polysilane, was eliminated as methane during the earlier stages of the pyrolysis and that the resulting pyropolymer was likely to be correspondingly richer in silicon.

Although this pyropolymer was found to be largely amorphous, x-ray analysis showed three diffraction lines attributable to cubic silicon. The C(1s) and Si(2p) photoelectron spectra also revealed that elemental silicon was present, together with silicon bonded to carbon and a carbide form of carbon. Under the particular reaction conditions described in this example, more silicon was present as the element than as silicon carbide.

EXAMPLE 22

This example illustrates the pyrolysis of aromatic poly(phenylhydridosilane) to a pyropolymer.

The techniques described in EXAMPLE 21, were also used to study the thermal decomposition of polyphenylhydridosilane, prepared as described in EXAMPLE 1. In this case the volatile products included phenylsilane, benzene and hydrogen. The polymer was again heated under vacuum and became bright yellow at 330° C., darkened to amber at 560° C. and finally converted to a vitreous black ceramic pyropolymer at 910° C.

Summarizing, with amount in mmoles:

$$(C_6H_5SiH)_n \xrightarrow{910°}$$

80 mg
(0.76 mmole)

benzene and phenylsilane + hydrogen + black glass 16.5 mg         (0.70 mmole)

The black pyropolymer did not show an x-ray diffraction pattern. Thermolysis of this polymer was also followed thermogravimetrically, using the heating rate and nitrogen flow rate described in EXAMPLE 3. The weight loss curve was broadly similar to that of the copolymer with a maximum weight loss of 48 percent attained by 580° C.

EXAMPLE 23

This example illustrates the pyrolysis of poly(methylhydridosilane) in the presence of ammonia to form a silicon nitride-containing pyropolymer.

A 0.2 g sample of poly(methylhydridosilane) (see EXAMPLE 2) was heated under vacuum to 950° C. at 10° C. per minute, and this final temperature was maintained for 5 hrs. There was some loss of volatile products as described in detail in EXAMPLE 21. Without any exposure of the resultant pyropolymer to the atmosphere, an excess of pure gaseous ammonia was admitted to the evacuated chamber until a pressure of 10 cm of Hg was obtained. Heating was continued at 950° C. for 5.5 hours. The resultant pyropolymer was cooled under vacuum and spectroscopic analysis confirmed the presence of silicon nitride, and its elemental analyses $C_{2.9}N_{1.0}Si_{3.6}$ corresponded to a composition $3SiC \cdot Si_3N_4$.

Various modifications and alterations of this invention will become apparent to those skilled in the art without departing from the scope and spirit of this invention, and it should be understood that this invention is not to be unduly limited to the illustrative embodiments set forth herein.

We claim:

1. A polyhydridosilane having a catenated silicon backbone having an average of 20 to 4000 silicon atoms with a number of hydride atoms per silicon atom in the range of 0.3 to 2.2, at least 0.1 gram of said polyhydridosilane being soluble at 20° C. in 100 grams of at least one of the organic solvents selected from the group consisting of tetrahydrofuran, toluene, and methylene chloride, said polyhydridosilane being tractable and moisture-sensitive.

2. An organic solvent-soluble polymer having a backbone consisting essentially of repeating monomeric units having the formula

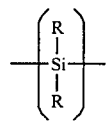

where
R is the same or different and is independently selected from the group consisting of (1) hydrogen, (2) a linear, branched, or cyclic aliphatic group having 1 to 10 carbon atoms and optionally containing at least one Periodic Group VA or VIA atom, (3) an aromatic group which is unsubstituted or substituted by up to three $C_1$ to $C_{10}$ linear, branched, or cyclic aliphatic groups, said aromatic or aliphatic groups optionally containing at least one Periodic Group VA or VIA atom, the total number of carbon atoms being up to 25, (4) a single bond connecting two silicon atoms, (5) a metal atom selected from the group consisting of Periodic Groups IA and IIA, and (6) an inorgano- and organometallic group comprising at least one Periodic Group IB to VIIB, VIII, Lanthanide or Actinide element,
with the proviso that
the ratio of hydride to silicon is in the range of 0.3 to 2.2;
the average number of monomeric units of said formula in the polymer is in the range of 20 to 4,000, and
said polymer being tractable and moisture-sensitive.

3. The polymer according to claim 2 wherein said monomeric units are randomly arranged.

4. The polymer according to claim 2 wherein each R is independently selected from hydrogen, methyl, ethyl, phenyl, and a single bond connecting two silicon atoms.

5. The polymer according to claim 2 having an average number in the range of 12 to 4000 units of the formula $\text{-}(SiH_{0.3-2.2})\text{-}$.

6. The polymer according to claim 2 which is selected from a random copolymer of (a) a dialiphaticsilane and a dihydridosilane, and a random copolymer of (b) an aliphatichydridosilane and an aromatichydridosilane.

7. The polymer according to claim 2 selected from polymers comprising at least one monomeric unit selected from units having the formulae $-(SiH_2)-$, $-(CH_3SiH)-$, $-(C_6H_5SiH)-$ and $-(C_2H_5SiH)-$.

8. The polymer according to claim 2 wherein R is selected from the group consisting of hydrogen, alkyl, alkoxy, alkylamino, aryl, arylamino, and a single bond connecting two silicon atoms, and combinations thereof.

9. The polymer according to claim 2 wherein each R is independently selected from the group consisting of hydrogen, methyl, ethyl, n-butyl, methoxy, benzyl, benzylmethylamino, phenethyl, and a single bond connecting two silicon atoms.

10. An organic solvent-soluble polymer having a backbone consisting essentially of repeating monomeric units having the formula

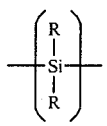

where

R is the same or different and is independently selected from the group consisting of (1) hydrogen, (2) a linear, branched, or cyclic aliphatic group having 1 to 10 carbon atoms and optinally containing at least one Periodic Group VA or VIA atom, (3) an aromatic group which is unsubstituted or substituted by up to three $C_1$ to $C_{10}$ linear, branched, or cyclic aliphatic groups, said aromatic or aliphatic groups optionally containing at least one Periodic Group VA or VIA atom, the total number of carbon atoms being up to 25, (4) a single bond connecting two silicon atoms, (5) a metal atom selected from the group consisting of Periodic Groups IA and IIA, and (6) an inorgano- or organometallic group comprising at least one Periodic Group IB to VIIB, VIII, Lanthanide or Actinide element, with the proviso that the ratio of hydride to silicon is in the range of 0.3 to 2.2; the average number of monomeric units of said formula in the polymer is in the range of 9 to 4,000, and said polymer being tractable and moisture-sensitive, said polymer further comprising at least one group selected from

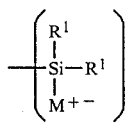

wherein $R^1$ is selected from the group consisting of (1) hydrogen, (2) a linear, branched or cyclic aliphatic group having 1 to 10 carbon atoms and optionally containing at least one catenary oxygen atom, (3) an aromatic group optionally substituted by up to three $C_1$ to $C_{10}$ linear, branched, or cyclic aliphatic groups, said aliphatic and aromatic groups optionally containing at least one catenary oxygen atom, the total number of carbon atoms being up to 25, and (4) a single bond connecting two silicon atoms; and M is a Periodic Group IA or IIA metal.

11. The polymer according to claim 10 wherein M is selected from the group consisting of sodium and lithium.

12. The polymer according to claim 2 which has been substantially crosslinked.

13. A method of preparing a polyhydridosilane having an average of 9 to 4000 silicon atoms and having a hydride to silicon ratio in the range of 0.3 to 2.2 comprising the steps of:

a. providing at least one hydridosilane having the formula $(R^1)_2SiX_2$, wherein $R^1$ is selected from the group consisting of (1) hydrogen, (2) a linear, branched, or cyclic aliphatic group having 1 to 10 carbon atoms and optionally containing at least one catenary oxygen atom, (3) an aromatic group optionally substituted by up to three $C_1$ to $C_{10}$ linear, branched, or cyclic aliphatic groups, said aliphatic and aromatic groups optionally containing at least one catenary oxygen atom, the total number of carbon atoms being up to 25, and (4) a single bond connecting two silicon atoms;

X is a halogen atom, and b. reacting said at least one hydridosilane in the presence of a catalytically effective amount of naphthalene or other polynuclear aromatic compound with a Periodic Group IA or Group IIA metal or alloy in an amount of at least 1 equivalent of metal per equivalent of halogen in an inert atmosphere and in an inert diluent for a time sufficient to provide a polyhydridosilane, at least 0.1 gram of said polyhydridosilane being soluble in 100 grams of organic solvent at 20° C.

14. The method according to claim 13 wherein said polyhydridosilane comprises repeating monomeric units having the formula:

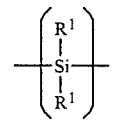

wherein $R^1$ is as defined in claim 13; and wherein the ratio of hydride to silicon is in the range of 0.3 to 2.2; and the average number of monomeric units in the polymer is in the range of 9 to 4000.

15. The method according to claim 13 further comprising the step of reacting said resulting polyhydridosilane with a sufficient quantity of a Periodic Group IA or IIA metal to provide a silyl derivative of a Group IA or IIA metal having the formula

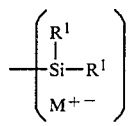

wherein
$R^1$ is as defined in claim 13, and
M is a Periodic Group IA or IIA metal.

16. The method according to claim 13 further comprising the step reacting said polyhydridosilane with a reagent selected from alcohols, amines, alkenes, aromatic or aliphatic halides having the formulas ROH, $R_2NH$, $R_2C=CR_2$, respectively and inorgano or organometallic compounds $R^2M$, wherein R is the same or different and is independently selected form the group consisting of (1) hydrogen, (2) a linear, branched or cyclic aliphatic group having 1 to 10 carbon atoms and optionally containing at least one Periodic Group VA or VIA atom, (3) an aromatic group which is unsubstituted or substituted by up to three $C_1$ to $C_{10}$ linear, branched, or cyclic aliphatic groups, said aromatic or aliphatic groups optionally containing at least one Periodic Group VA or VIA atom, the total number of carbon atoms being up to 25, and (4) a single bond connecting two silicon atoms, and $R^2$ is defined the same as R, and M is a Group IA or IIA metal.

17. The method according to claim 15 further comprising the steps of:

a. treating said silyl derivative of a Group IA or IIA metal with a compound selected from the group consisting of aliphatic or aromatic halide $R_3CX$, transition metal halide $TX_nL_m$ and CuCl, wherein R is the same or different and is independently selected from the group consisting of (1) hydrogen, (2) a linear, branched, or cyclic aliphatic group having 1 to 10 carbon atoms and optionally containing at least one Periodic Group VA or VIA atom, (3) an aromatic group which is unsubstituted or substituted by up to three $C_1$ to $C_{10}$ linear, branched, or cyclic aliphatic groups, said aromatic or aliphatic groups optionally containing at least one Periodic Group VA or VIA atom, the total number of carbon atoms being up to 25, and (4) a single bond connecting two silicon atoms, T is selected from one or more of Ti, Zr, Hf, V, Nb, Ta, Cr, Mo, W, Mn, Re, Fe, Ru, Os, Co, Rh, Ir, Ni, Pd, Pt, or Actinide or Lanthanide metal, M is a Periodic Group IA or IIA metal, L is independently selected from one or more of the following groups: (1) an aliphatic or aromatic group containing one or more carbon-to-carbon multiple bonds; (2) a group containing one or more Periodic Group VA atoms optionally substituted with up to 4 groups independently selected from aliphatic and aromatic groups and hydrogen atoms; or the Group VA atom or atoms may be part of an aromatic group, or the Group VA atom may be multiply bonded to carbon and optionally substituted with at least one aliphatic or aromatic group, (3) a group containing one or more Group VIA atoms optionally substituted by up to 5 groups independently selected from aliphatic and aromatic groups, or a hydrogen atom, or, the Group VIA atom(s) may be multiply bonded to carbon and optionally substituted with at least one aliphatic or aromatic group; (4) $R^1$ is as defined above; (5) CO; and wherein M is selected depending on L so as to achieve a stable compound, X is a halogen atom, n is an integer from 1 to 5, and m is an integer from 1 to 6.

18. A polyhydridosilane having a catenated silicon backbone having an average of 20 to 4000 silicon atoms with a number of hydride per silicon atom in the range of 0.3 to 2.2, at least 0.1 gram of said polyhydridosilane being soluble at 20° C. in 100 grams of at least one of the organic solvents selected from the group consisting of tetrahydrofuran, toluene, and methylene chloride, said polyhydridosilane being tractable and moisture-sensitive.

19. The polymer according to claim 10 wherein the average number of monomeric units of said formula

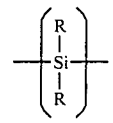

is in the range of 20 to 4000.

* * * * *